United States Patent [19]

Suda et al.

[11] 3,928,469

[45] Dec. 23, 1975

[54] PROCESS FOR THE CLEAVAGE OF HYDROPEROXIDES

[75] Inventors: Hideaki Suda, Takaishi; Iwao Dohgane, Nishinomiya; Takashi Chinuki, Toyonaka; Hidekazu Fujino, Moriguchi; Kenji Tanimoto; Hirokazu Hosaka, both of Minoo; Kazunari Ehara, Takarazuka; Yukimichi Nakao, Kobe; Yuji Ueda, Izumiotsu; Seiya Imada, Sakai; Minoru Yasuda, Osaka, all of Japan

[73] Assignee: Sumitomo Chemical Company, Limited, Osaka, Japan

[22] Filed: May 21, 1973

[21] Appl. No.: 362,212

[30] Foreign Application Priority Data

May 23, 1972 Japan................................ 47-51398

[52] U.S. Cl. ......... 260/621 C; 260/592; 260/610 B; 260/624 R; 260/624 B; 260/621 K
[51] Int. Cl.$^2$ ......................................... C07C 39/08
[58] Field of Search ............ 260/592, 610 B, 621 C, 260/624 R, 624 B, 621 K

[56] References Cited

UNITED STATES PATENTS

| | | | |
|---|---|---|---|
| 2,715,646 | 8/1955 | Hawkins et al. | 260/610 B |
| 2,805,258 | 9/1957 | Boodman et al. | 260/610 B |
| 2,915,557 | 12/1959 | Kreps et al. | 260/610 B |

FOREIGN PATENTS OR APPLICATIONS

| | | | |
|---|---|---|---|
| 754,864 | 8/1956 | United Kingdom | 260/621 C |
| 619,753 | 5/1961 | Canada | 260/592 |

*Primary Examiner*—D. Horwitz
*Attorney, Agent, or Firm*—Stevens, Davis, Miller & Mosher

[57] ABSTRACT

A process for the cleavage of diisopropylbenzene dihydroperoxides, which comprises heating an oxidation product of diisopropylbenzene containing m-diisopropylbenzene dihydroperoxide together with at least one member of the p-isomer and its cleavage products, whereby m-diisopropylbenzene dihydroperoxide is effectively cleaved to give resorcin.

5 Claims, No Drawings

PROCESS FOR THE CLEAVAGE OF HYDROPEROXIDES

The present invention relates to a process for the cleavage of m-diisopropylbenzene dihydroperoxide, and more particularly a process therefor characterized in that said cleavage is carried out in the presence of p-diisopropyl-benzene dihydroperoxide and/or the cleavage products thereof.

It is well known that m-diisopropylbenzene is oxidized in liquid phase with oxygen or oxygen-containing gas to give the oxidation products containing m-diisopropyl-benzene dihydroperoxide from which said dihydroperoxide is isolated by, e.g., an extraction with alkalis, and then is subjected to a catalytic cleavage to give resorcin.

According to the process, resorcin can be obtained in a high yield of above 95 % provided that m-diisopropylbenzene dihydroperoxide is of a high purity. Similarly as in the above case, hydroquinone can also be obtained from P-diisopropylbenzene by a similar process, and especially when p-diisopropylbenzene dihydroperoxide is of a high purity it can be obtained nearly quantitatively by very conventional cleavage processes.

As described above, those high yields can be obtained only when high-purity dihydroperoxides are used as a material, and on the other hand the yields are very low when hydroperoxides having a low-purity are cleaved. However, when a high-purity dihydroperoxide is used as a material for cleavage in order to obtain a desired cleavage product substantially quantitatively, a difficulty encountered is that oxidation products of diisopropylbenzene inevitably contain, in addition to an aimed dihydroperoxide, other hydroperoxides including monohydroperoxide which is a precursor of the dihydroperoxide, and other by-products. Therefore it is necessary either to oxidize diisopropyl-benzene in such a way that the oxidation reaction can be carried out extremely quantitatively without causing substantially any side reaction, or to isolate a desired dihydroperoxide alone, in a high purity and selectively, from the oxidation products by a very effective separation procedure.

However, it is practically difficult to carry out the oxidation reaction in a conversion satisfying economical requirements and at the same time in a condition causing no side reactions.

Although it might be possible to separate the desired dihydroperoxide in a state of high purity from the oxidation products, the separation must be carried out in a solid state because m-and p- diisopropylbenzene dihydroperoxides are each a solid at room temperature when they are highly pure. Thus, the increase in purity requires a dangerous operation, i.e., a handling of solid peroxides, and the operation becomes more dangerous as the purity becomes higher. For the purpose of facilitating the handling as much as possible, the separation can, of course, be carried out in a molten state, however it is not practical as the purity thereof is deteriorated due to decomposition and the like.

Generally considering the problems above mentioned, it can be concluded that a high-yield cleavage of high-purity dihydroperoxides which encounters the practical difficulty of obtaining the high-purity dihydroperoxides is very difficult to be carried out on an industrial scale and with an economical advantage.

When a process for the cleavage on an industrial scale with economical advantages is to be designed taking into consideration of both efficiency in the oxidation and safety and efficiency in the succeeding separation and purification of dihydroperoxides, it can be concluded that the cleavage of high-purity dihydroperoxides is hardly practiced and that the cleavage of the peroxide containing a considerable amount of impurities is inevitable.

That is, oxidation products which are obtained by oxidizing diisopropylbenzenes commonly contain a desired diisopropylbenzene dihydroperoxide and other types of hydroperoxide including diisopropylbenzenemonohydroperoxide as a precursor, and (2-hydroxy-2-propyl-cumenhydroperoxides (being a carbinol group-containing hydroperoxide, hereinafter referred to as C-HPO and its m- and p-isomers are referred to as m-(C-HPO) and p-(C-HPO), respectively) and acetylcumenehydroperoxide (being an acetyl group-containing hydroperoxide, hereinafter referred to as A-HPO and its m- and p-isomers are referred to as m-(A-HPO) and p-(A-HPO), respectively) as by-products; as well as various other types of by-products including cumyldimethyl carbinol and isopropylacetophenone. The formation of so many types of undesired hydroperoxides and by-products can never be avoided even if the oxidation reaction were carried out under any elaborate conditions to inhibit side reactions and at the same time to promote an intended reaction alone, and therefore it can be concluded that a reaction mixture containing the above by-products should be subjected to a separation and refining processes to isolate dihydroperoxides. However, as mentioned above, the isolation of a desired dihydroperoxides alone from the reaction mixture is difficult to carry out without the dangerous handling of the dihydroperoxides in a solid state, and even if the isolation process were carried out it becomes possible, in most cases, that the dihydroperoxides can barely be separated from monohydroperoxide as precursor. Therefore a method by which high-purity dihydroperoxides can be isolated safely and efficiently has not yet been established. Thus the present situation is that a dihydroperoxide containing oxidation mixture which is to be subjected to a cleavage inevitably contains the by-products produced by the oxidation reaction, which are somewhat or extremely difficult to seperate, such as C-HPO, A-HPO or the products above mentioned, and that the oxidation mixture containing all these products is subjected to the cleavage unavoidably.

However, the mixture containing those by-products in addition to dihydroperoxides does not always give a satisfactory cleavage yield of the dihydroperoxides and the yield thereof is very low as compared with high purity dihydroperoxides. For example, a crude hydroperoxide mixture which is obtained from oxidation products of m-diisopropylbenzene, and which has a composition consisting of 72 % of m-diisopropylbenzene dihydroperoxide, 20 % of C-HPO, 2 % of A-HPO and 6 % of others, is cleaved in a usual manner to give only a low cleavage yield of about 70 to 73 %, the cleavage yield being a molar ratio of resorcin obtained to m-diisopropylbenzene dihydroperoxide used.

The object of this invention is to provide a process for cleaving diisopropylbenzene dihydroperoxides contaminated by its precursor and the by-products both formed during the oxidation of the corresponding diisopropylbenzenes.

The inventors have made extensive studies to increase the yield of m-diisopropylbenzene dihydroperoxide of which the purity is not so high as above, and have found surprising facts that among by-products contained in the oxidation mixture the above C-HPO has the worst effect on the cleavage reaction and A-HPO is the next, and that a cleavage yield of m-diisopropylbenzene dihydroperoxide is increased when p-isomer that is, p-diisopropylbenzene dihydroperoxide, is added to the reaction and the cleavage of the both are carried out simultaneously, and furthermore that the cleavage of p-isomer is not affected, and thus accomplished this invention.

Thus, the present invention is to provide a process for the cleavage of diisopropylbenzene dihydroperoxides, which comprises heating an oxidation product of diisopropylbenzene containing m-diisopropylbenzene dihydroperoxide in an organic solvent together with at least one member of p-diisopropylbenzene dihydroperoxide and its cleavage product in the presence of an acidic catalyst.

In the present invention, the cleavage product of p-diisopropylbenzene dihydroperoxide includes hydroquinone and compounds represented by the following formulae (I) to (IV).

The detrimental effect of by-products was examined. As is shown in Table 1, the presence of A-HPO and especially C-HPO most largely reduces the yield of the cleavage.

Table 1[1]

| Compound added | Amount added[2] —% | Cleavage yield[3] 96.2% |
|---|---|---|
| no | | |
| A-HPO | 1 | 94.2 |
| | 3 | 91.4 |
| | 10 | 82.5 |
| C-HPO | 1 | 92.6 |
| | 5 | 85.3 |
| | 10 | 74.8 |
| | 30 | 60.9 |

Remarks:
[1] m-Diisopropylbenzene dihydroperoxide of 99.3% in purity was cleaved under a usual condition by the addition of a required amount of m-(A-HPO) or m-(C-HPO).
[2] Amount added shows a percentage by weight of A-HPO or C-HPO contained in dihydroperoxide used.
[3] Cleavage yield shows a yield (%) based on dihydroperoxide used.

However, a surprising result was further observed in that, when p-diisopropylbenzene dihydroperoxide is present in the cleavage of m-diisopropylbenzene dihydroperoxide, it can reduce the bad effect of A-HPO nd C-HPO, that is, when p-diisopropylbenzene dihydroperoxide and/or the cleavage products thereof are

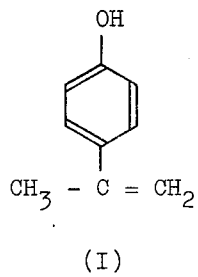

(I)

p-isopropenylphenol

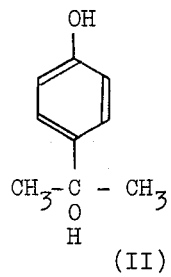

(II)

p-(2-hydroxy-2-propyl)-phenol

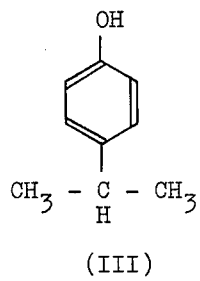

(III)

p-isopropylphenol

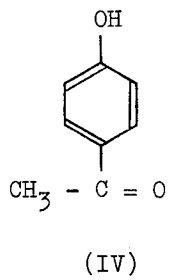

(IV)

p-hydroxyacetophenone

The presence of the compounds (I) to (IV) is, as is mentioned above, due to the inevitable presence of impurities in the oxidation product of p-diisopropylbenzene.

further added to the m-diisopropyl-benzene dihydroxide they act effectively to promote the proper cleavage of m-diisopropylbenzene dihydroperoxide as shown in Table 2.

Table 2[1]

| Ratio of dihydro-peroxides m-isomer / p-isomer | Compounds added and amounts thereof | | | | | | Mixture of n-(C—HPO) and p-(C—HPO) in a ratio of 1 : 2 |
|---|---|---|---|---|---|---|---|
| | m-(A—HPO) | m-(C—HPO) | | p-(A—HPO) | p-(C—HPO) | | |
| | 10% | 10% | 30% | 10% | 10% | 30% | 30% |
| 100/0 | 82.5 | 74.8 | 60.9 | 84.3 | 78.1 | 63.5 | — |
| 90/10 | 85.9 | 79.2 | 68.7 | 87.1 | 81.6 | 70.2 | 71.0 |
| 80/20 | 87.7 | 82.4 | 74.1 | 88.6 | 83.5 | 75.8 | 76.6 |
| 60/40 | 89.0 | 83.5 | 77.3 | 90.0 | 83.1 | 76.4 | 78.7 |

Remarks:
[1]A mixture of m-diisopropylbenzene dihydroperoxide of 99.3% in purity and p-isomer of 99.7% in purity was subjected to a cleavage under a normal process and condition by the addition of a required amount of compounds to be added.
[2]A ratio of components shows a ratio of percentages by weight of m-diisopropylbenzene dihydroperoxide to p-isomer.
[3]Figures in Table show a cleavage yield in percent based on m-dihydroperoxide in a mixture of m- and p-isomers.
[4]The others are the same as in Remarks for Table 1.

The total amount of p-diisopropylbenzene dihydroperoxide and/or the cleavage products thereof gives a good result in an amount of at least about 5 % by weight, perferably from above 10 % to 80 % by weight and practically 30 to 40 % by weight. The good effect is difficult to confirm in a range of below 5 % or above 80 % by weight.

As is mentioned above, the contaminated m-diisopropylbenzene dihydroperoxide, when cleaved in the presence of p-isomer, can give a high cleavage yield that has never been achieved in the absence of p-isomer. Furthermore, another surprising advantage of the present invention is that p-diisopropylbenzene dihydroperoxide added can be cleaved in a high yield without being so affected by A-HPO and C-HPO.

The experimental results shown in Table 3 can be considered to prove the information regarding the above mentioned good cleavage yield of p-isomer and were first disclosed by the present inventors.

Table 3 [1]

Table 3 shows the cleavage yields of p-diisopropylbenzene dihydroperoxide [2] itself in the presence of m-(A-HPO) or m-(C-HPO).

| Compounds added | Amounts added —% | Cleavage yield |
|---|---|---|
| none | | 98.7% |
| m-(A-HPO) | 1 | 97.7 |
| | 3 | 98.0 |
| | 10 | 93.4 |
| m-(C-HPO) | 1 | 98.8 |
| | 5 | 96.0 |
| | 10 | 94.3 |

Remarks:
[1]Experiments were carried out according to the first experiments and the results were indicated according to the Remarks for Table 1.
[2]Purity is 99.7%

Results of further investigations also showed that the co-existence effect of p-dihydroperoxide is not always proportional to the amount thereof added.

Thus, it can be considered that, when p-diisopropylbenzene dihydroperoxide is present in the cleavage of m-diisopropylbenzene dihydroperoxide, it acts effectively to prevent a vain consumption of resorcin due to the presence of C-HPO or cleavage products thereof such as styrenes, or A-HPO or cleavage products thereof such as acetophenones.

In carrying out the process of the present invention, the cleavage is carried out in an organic solvent at a temperature of 50°C to the boiling point of the organic solvent to be used in the presence of an acidic catalyst. The cleavage is usually completed within 1 to 60 minutes. Examples of the organic solvents are alcohols, ketones or alkylbenzenes.

The acidic catalysts include inorganic acids such as hydrochloric acid, and sulfuric acid, and organic acid such as acetic acid.

According to the present invention, cleavage products containing both resorcin and hydroquinone are obtained, which are separated into the two components by further treatments.

Accordingly, the process of the present invention can be effectively applied to the cleavage of a mixture of m- and p-diisopropylbenzene dihydroperoxides in the production of resorcin and hydroquinone.

In the above description, a remarkable effect of the co-existence of p-diisopropylbenzene dihydroperoxide on the cleavage of m-isomer has been described by means of model experiments, and the same effect can also be observed with the oxidation mixture obtained by oxidizing diisopropylbenzene, as illustrated with reference to the following examples which should not be construed to restrict the present invention.

EXAMPLE 1

Five hundred grams of a crude hydroperoxide solution obtained by oxidizing diisopropylbenzenes, which contains 280 g. of m-diisopropylbenzene dihydroperoxide, 72 g. of p-diisopropylbenzene dihydroperoxide, 100 g. of C-HPO and 10 g of A-HPO, was added while stirring to a mixed solution of 500 g of acetone and 2.5 g of 98 % sulfuric acid at 50° to 55°C. over a period of 30 minutes. The reaction mixture was neutralized with 5 g of sodium carbonate and then inorganic salts formed were removed therefrom. The resulting solution was subjected to an analysis, which showed that the yield of resorcin based on m-diisopropylbenzene dihydroperoxide, that is, a cleavage yield, was 80.3 %.

EXAMPLE 2

Five hundred grams of a crude hydroperoxide solution obtained by oxidizing diisopropylbenzene, which contains 250 g of m-diisopropylbenzene dihydroperoxide, 165 g of p-isomer, 50 g of C-HPO and 15 g of A-HPO, was added while stirring to a mixed solution of 300 g of acetone and 0.5 g of $SO_3$ at 50°C over a period of 40 minutes. The reaction solution was neutralized with sodium carbonate and then inorganic salts formed were removed therefrom. The resulting solution was subjected to an analysis, which showed that the yield of resorcin based on m-diisopropylbenzene dihydroperoxide was 85.3 %, and that the yield of hydroquinone based on p-isomer was 93.8 %.

What we claim is:

1. In a process for the cleavage of diisopropylbenzene dihydroperoxide which comprises heating an oxidation product of diisopropylbenzene containing m-diisopropylbenzene dihydroperoxide in an organic solvent selected from the group consisting of alcohols, ketones and alkyl benzenes in the presence of an acidic catalyst, the improvement comprising incorporating p-diisopropylbenzene dihydroperoxide in the material to be cleaved in an amount of from 5% to 80% by weight based on m-diisopropylbenzene dihydroperoxide to thereby improve the yield of resorcin from m-diisopropylbenzene.

2. The process according to claim 1, wherein the reaction temperature is within a range of from 50°C to a boiling point of the organic solvent.

3. The process according to claim 1, wherein the reaction time is within a range of from 1 minute to 1 hour.

4. The process according to claim 1, wherein an acidic catalyst is one member selected from the group consisting of sulfuric acid, hydrochloric acid and organic acids.

5. The process according to claim 1, wherein the incorporating is conducted by adding p-diisopropylbenzene to m-diisopropylbenzene prior to the oxidation.

* * * * *